United States Patent [19]

Schuhmacher et al.

[11] 3,960,170
[45] June 1, 1976

[54] PRESSURE REGULATING VALVE

[75] Inventors: Werner Schuhmacher, Asperg; Karl-Heinz Rothenstein, Hochdorf, both of Germany

[73] Assignee: Robert Bosch G.m.b.H., Stuttgart, Germany

[22] Filed: Mar. 18, 1975

[21] Appl. No.: 559,642

[30] Foreign Application Priority Data
Mar. 20, 1974 Germany............................ 2413273

[52] U.S. Cl. ............................................. 137/491
[51] Int. Cl.² ......................................... G05D 16/00
[58] Field of Search................ 137/491, 489.3, 492, 137/492.5, 488, 487, 486, 489; 251/44

[56] References Cited
UNITED STATES PATENTS

| | | | |
|---|---|---|---|
| 2,654,975 | 10/1953 | Adams et al. | 137/491 X |
| 2,923,306 | 2/1960 | Mitchell | 137/491 X |
| 3,402,734 | 9/1968 | Robbins, Jr. | 137/491 |
| 3,411,531 | 11/1968 | Clark et al. | 137/491 |
| 3,613,716 | 10/1971 | Hoheisel | 137/491 |
| 3,703,911 | 11/1972 | Horikiri | 137/491 |

*Primary Examiner*—Martin P. Schwadron
*Assistant Examiner*—Robert J. Miller
*Attorney, Agent, or Firm*—Michael J. Striker

[57] ABSTRACT

A main valve has a housing, a valve member slidable in the housing and defining at its opposite ends two pressure chambers, a high-pressure port and a low-pressure port of which one communicates with one of the chambers, a throttle connecting the chambers and a spring acting in the other chamber upon one end of the valve member and urging the same from a blocking position towards a rest position. A control valve has a fluid line which communicates with the other of the chambers for selecting a main-valve response pressure. A first set of passages connects the ports with one another via the one chamber when the valve member approaches the rest position thereof, and a second set of passages connects the chambers with one another when the valve member approaches its blocking position.

7 Claims, 1 Drawing Figure

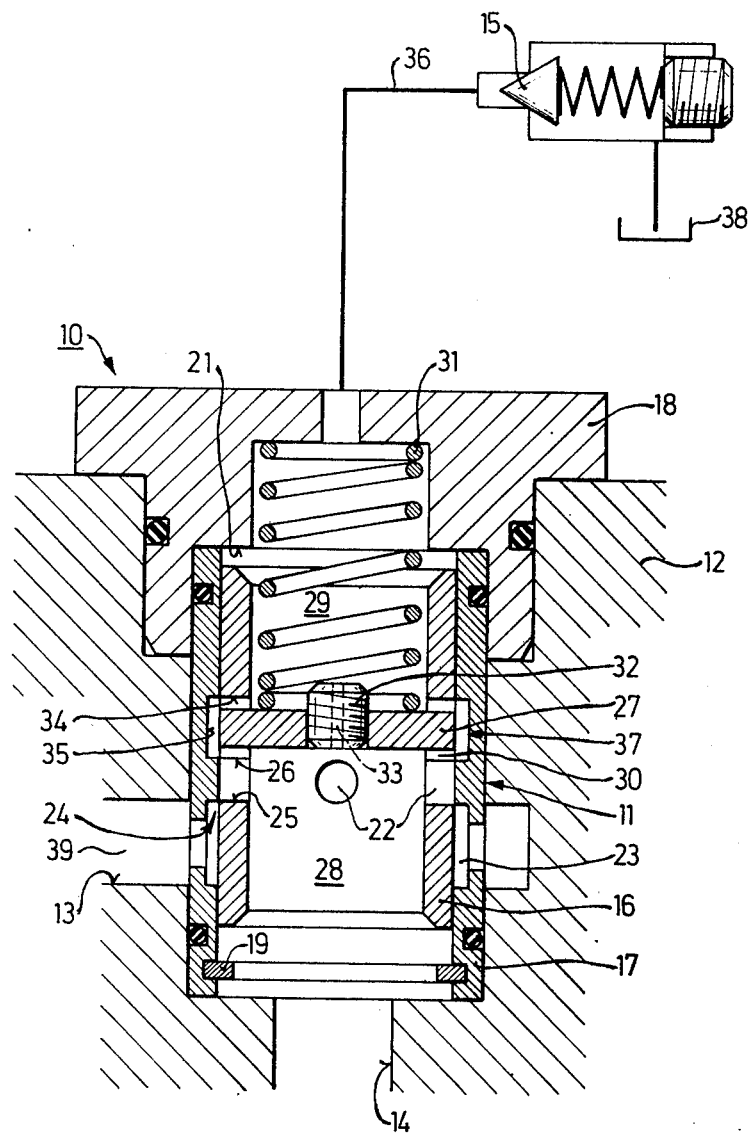

PRESSURE REGULATING VALVE

BACKGROUND OF THE INVENTION

The present invention relates generally to a valve, and more particularly to a pressure-reducing valve. Still more specifically, the invention relates to a pressure-reducing valve wherein the response pressure of a main valve can be controlled by setting of a control valve.

Pressure regulating valves of this type are already known. However, they have certain disadvantages, at least under some operating circumstances. In particular, if large relatively compressible fluid volumes are active upon the controlled low pressure side of the valve, which require relatively substantial compression in the case of pressure variations, the prior-art valves will not be properly responsive. For example, if the response pressure which has been preselected with the control valve is dropped rapidly, the pressure at the lower sides will follow this change only very slowly, because when the main valve is closed the compression volume at the low pressure side can be discharged only via the control oil flow of the control valve. Since further the main valve has a positive overlap when its valve member is in blocking position, pressure oscillations occur at the low pressure side which may be substantial as to frequency and amplitude; these oscillations are usually found to be disturbing or unacceptable.

SUMMARY OF THE INVENTION

Accordingly, it is an object of the present invention to overcome the disadvantages of the prior art.

More particularly, it is an object of this invention to provide a pressure reducing valve having a control valve associated with it, which is not subject to the aforementioned disadvantages.

Still more specifically, it is an object of the present invention to provide such a pressure reducing valve which is simple in its construction and nevertheless has significantly improved operating characteristics.

In keeping with these objects, and with others which will become apparent hereafter, one feature of the invention resides in a pressure regulating valve which, briefly stated, comprises a main valve having a housing, a valve member slidable in the housing and defining at its opposite ends two pressure chambers, a high-pressure port and a low-pressure port of which one communicates with one of the chambers, a throttle connecting the chambers, and a spring acting in the other chamber upon one end of the valve member and urging the same from a blocking position towards a rest position. A control valve has a fluid line communicating with the other of the chambers for selecting a main-valve response pressure. First passage means connects the ports with one another via the one chamber when the valve member approaches the rest position, and second passage means connects the chambers with one another when the valve member approaches the blocking position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE is a sectional view, illustrating a valve according to the invention.

DESCRIPTION OF THE PREFERRED EMBODIMENTS

The pressure reducing valve 10 in the drawing has a main valve 11 which is mounted in a housing 12 that is provided with a high-pressure port 13 and a low-pressure port 14. The valve 10 further comprises a control valve 15.

A hollow valve member 16 is slidably movable in a sleeve 17 which is fixedly mounted in the housing 12, being retained by cover 18. A circlip 19 in the sleeve 17, and a shoulder 21 on the cover 18, delimit the sliding movement of the valve member 16. The latter is provided with bores or openings 22 which serve as control passages and are associated with a first annular groove 23 formed on the sleeve 17 and which control a first passage or connection 24 which leads from the high-pressure port 13 to the low-pressure port 14. The bores 22 are formed with edge portions which form a first control edge 25 which in a rest position of the valve member 16, and which the latter engages the circlip 19, fully open the first passage 24. In the illustrated blocking position in which the first control edge 25 and the associated edge bounding the annular groove 23 overlap, this first passage is just interrupted. Intermediate its rest position and its blocking position the control member 16 can assume a plurality of regulating positions in which it opens the first passage 24 to a greater or lesser degree.

At the axial side opposite the first control edge 25 the bores 22 are provided with further edge portions which form a second control edge 26. From the control edge 26, and the direction towards a transverse divider wall 27 of the valve member 16, there extend two kerfs 30 which are associated with two diametrally opposite ones of the bores 22.

The divider wall 27 separates the low pressure compartment 28 from a control compartment 29 at the opposite end of the valve member 16; a spring 31 is located in the control chamber 29 and biases the valve member 16 in direction towards the circlip 19. Also mounted in the divider wall 27 is a screw 32 which is provided with a throttle 33 via which the chambers 28 and 29 are constantly in communication. Radial bores 34 are provided in the valve member 16 which extend to the control chamber 29. The sleeve 17 is formed, axially spaced from the annular groove 23, with a further annular groove 35 which is associated with the second control edge 26 and the kerfs 30 and into which the bores 34 discharge. The chamber 29 is in communication with the adjustable control valve 15 which is illustrated in a simplified version and communicates with the chamber 29 via a fluid line 36. The control valve 15 can open to permit flowing to discharge from the lines 36 to a fluid reservoir 38, and the pressure at which the valve 15 can open can be selected by appropriately stressing its spring to a greater or lesser degree in known manner.

The second control edge 26 with the kerfs 30, the grooves 35 and the bores 34 together constitute a second passage 37 which extends parallel to the throttle 33 and connects the chambers 28 and 29. A high pressure side 39 of the pressure reducing valve is associated with the high pressure port 13.

If the pressure at the low pressure chamber 28 is below the pressure preselected with the control valve 15, then the spring 31 urges the valve member 16 towards its rest position, in which the first control edge 25 fully opens the first passage 24 so that pressure fluid can flow freely from the high-pressure port 13 to the low-pressure port 14 via the groove 23 and the chamber 28.

If thereafter the pressure at the low pressure chamber 28 should rise beyond the nominal value preselected with the valve 15, then the valve 15 will open and pressure fluid will flow from the chamber 28 through the throttle 33, the chamber 29, the line 36 and the valve 15 until it finally reaches the reservoir 38. The pressure difference which develops at the throttle 33 acts counter to the force of the spring 31, displacing the valve member 16 into a regulating position or else into its blocking position in which it so throttles or completely blocks the passage 24 that the desired pressure is maintained in the usual manner at the low pressure chamber 28.

If a relatively large compressible pressure medium volume is in communication with the low pressure chamber 28, and if the preselected response pressure at the valve 15 is abruptly dropped, the pressure at the chamber 28 will rapidly follow this pressure drop, in contradistinction to the prior-art valves of this type. This is achieved in that shortly before the first control edge 25 closes the first passage 24, the kerfs 30 already open the second passage 35 so that pressure fluid can flow from the chamber 28 not only via the throttle and into the chamber 29, but also parallel to the throttle via the kerfs 30, the grooves 35 and the bores 34. This causes a rapid pressure deterioration in the chamber 28 and prevents an excessive decrease of pressure in the chamber 29.

For the aforementioned reasons the valve member 16 cannot, as in the prior art, move to the abutment 21 and contact the same, and it also cannot move excessively passed the point where its first control edge 25 overlaps the associated edge of the first groove 23. The valve member 16 can now move much more rapidly from its blocking position into a regulating position, since additional pressure fluid can flow via the second passage 37 into the chamber 29. This means that even if the response pressure selected with the valve 15 is changed very rapidly, the pressure at the chamber 28 can be rapidly adjusted even under disadvantageous conditions. The negative overlap at the control edges 25 and 26 associated with the first and second passages 24 and 27, which is the result of the provision of the kerfs 30, assures that an undesired fluctuation of the pressure in the chamber 28 is prevented, since a dead period resulting from positive overlap during the regulation is eliminated.

To avoid that the flow of control fluid might become excessive, the kerfs 30 are so arranged that when the control edge 25 just overlaps the associated edge of the first groove 23, only the two kerfs 30 by themselves establish communication which opens the second passage 37; the second control edge 26 may aid in opening the passage 37 only after the first passage 24 is completely blocked.

The arragement and construction of the second control edge 27, the bores 34 and the second annular grooves 35 are highly advantageous in a pressure-reducing valve having a hollow shiftable valve member, because they can be readily produced in a simple and inexpensive manner. Moreover, these features can readily be included even in existing pressure-reducing valves of this type. The number and size of the kerfs 30 can be readily accommodated to the particular requirements of a given situation. It is of course also possible to employ this invention in the case of a pressure-reducing valve having a solid cross-section slidable valve member, and this is fully within the intent and concept of the invention.

It will be understood that each of the elements described above, or two or more together, may also find a useful application in other types of constructions differing from the types described above.

While the invention has been illustrated and described as embodied in a pressure-reducing valve, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A pressure regulating valve, comprising a main valve having a housing, a valve member slidable in said housing and defining at its opposite ends two pressure chambers, a high-pressure port and a low-pressure port of which one communicates with one of said chambers, a throttle connecting said chambers, and a spring acting in the other chamber upon one of said valve member and urging the same from a blocking position in which it interrupts communication between said ports towards a rest position in which it permits communication between said ports; a control valve having a fluid line communicating with the other of said chambers for selecting a mainvalve response pressure; first passage means connecting said ports with one another via said one chamber when said valve member approaches said rest position; and second passage means parallel to said throttle and connecting said chambers with one another when said valve member approaches said blocking position.

2. A pressure regulating valve as defined in claim 1, said second passage means comprising a cover formed in said valve member for communicating said chambers with one another before communication of said ports via said first passage means is blocked.

3. A pressure regulating valve as defined in claim 1, wherein said low-pressure port communicates with said one chamber.

4. A pressure regulating valve as defined in claim 3, wherein said valve member has two control edges which block and unblock the respective passage means, the spacing between said control edges being smaller than the distance between control openings of the respective passage means with which said control edges cooperate.

5. A pressure regulating valve as defined in claim 4, wherein said valve member is a tubular member having an internal transverse wall provided with said throttle.

6. A pressure regulating valve as defined in claim 5, wherein said valve member has a circumferential wall formed with openings of which each has one edge portion facing one axial direction and constituting one of said control edges, and another edge port facing the opposite axial direction and constituting the other of said control edges.

7. A pressure regulating valve as defined in claim 6, wherein said housing is formed with axially spaced sets of radial bores constituting said control openings, said housing further having an inner circumferential wall formed with two axially spaced annular recesses each communicating with one of said sets of bores.

* * * * *